United States Patent
Barrenscheen et al.

(10) Patent No.: US 10,855,527 B2
(45) Date of Patent: Dec. 1, 2020

(54) BIDIRECTIONAL COMMUNICATION USING EDGE TIMING IN A SIGNAL

(71) Applicant: Infineon Technologies AG, Neubiberg (DE)

(72) Inventors: Jens Barrenscheen, Munich (DE); Reza Fotouhi, Munich (DE); Benno Koeppl, Markt Indersdorf (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/943,985

(22) Filed: Apr. 3, 2018

(65) Prior Publication Data

US 2019/0306014 A1    Oct. 3, 2019

(51) Int. Cl.

| | |
|---|---|
| *H04L 12/24* | (2006.01) |
| *H04L 5/00* | (2006.01) |
| *H04L 7/00* | (2006.01) |
| *H04L 25/49* | (2006.01) |
| *H04W 84/20* | (2009.01) |

(52) U.S. Cl.
CPC .......... *H04L 41/0803* (2013.01); *H04L 5/005* (2013.01); *H04L 7/0008* (2013.01); *H04L 25/4902* (2013.01); *H04W 84/20* (2013.01)

(58) Field of Classification Search
None
See application file for complete search history.

(56) References Cited

U.S. PATENT DOCUMENTS

| | | | |
|---|---|---|---|
| 5,020,038 A | 5/1991 | Swapp | |
| 7,203,730 B1* | 4/2007 | Meyer | G06F 3/0605 370/400 |
| 2005/0235110 A1* | 10/2005 | Mylly | G06F 13/4243 711/115 |
| 2009/0070506 A1* | 3/2009 | Furtner | H04L 25/4906 710/110 |
| 2012/0275527 A1 | 11/2012 | Douglass | |
| 2013/0094373 A1* | 4/2013 | Reidl | H04L 25/4902 370/252 |

(Continued)

OTHER PUBLICATIONS

Non-Final Office Action dated Jul. 28, 2020 in connection with U.S. Appl. No. 16/748,987.

*Primary Examiner* — Nicholas Sloms
(74) *Attorney, Agent, or Firm* — Eschweiler & Potashnik, LLC

(57) ABSTRACT

Systems, methods, and circuitries are provided to perform bidirectional communication using edge timing in a common signal. In one example, a method includes receiving a common signal on a signal line between a device and another device. The common signal includes a series of signal periods, and each signal period includes a first edge of a first type and a second edge of a second type different from the first type. In each signal period of the series of signal periods: information being communicated by the other device is determined based at least on the determined timing of the first edge and a timing for a subsequent second edge with respect to the signal period is determined based on information to be communicated to the other device. The subsequent second edge is generated at the selected timing in a subsequent signal period of the series of signal periods.

29 Claims, 6 Drawing Sheets

(56) References Cited

U.S. PATENT DOCUMENTS

| | | | |
|---|---|---|---|
| 2013/0246675 A1* | 9/2013 | Korpinen | G06F 13/42 710/110 |
| 2013/0322462 A1* | 12/2013 | Poulsen | H04J 3/06 370/458 |
| 2014/0143588 A1* | 5/2014 | Leinonen | G06F 11/0742 714/2 |
| 2015/0009050 A1 | 1/2015 | Lahr | |
| 2015/0270994 A1* | 9/2015 | Scherr | H04L 25/4902 375/238 |
| 2016/0050089 A1* | 2/2016 | Strasser | H04L 67/10 375/238 |
| 2016/0065399 A1* | 3/2016 | Scherr | H04L 25/4902 375/238 |
| 2016/0239449 A1* | 8/2016 | Hapke | G06F 13/4068 |
| 2016/0347179 A1* | 12/2016 | Bachmaier | B60L 50/62 |
| 2017/0060791 A1* | 3/2017 | Huh | G06F 13/1689 |
| 2018/0203063 A1* | 7/2018 | Guo | G01R 31/31715 |
| 2018/0237148 A1* | 8/2018 | Hehn | B64C 39/024 |

* cited by examiner

US 10,855,527 B2

BIDIRECTIONAL COMMUNICATION USING EDGE TIMING IN A SIGNAL

FIELD

The present disclosure relates to the field of communication protocols and techniques and in particular to methods, systems, and circuitry for communication of status and data between devices.

BACKGROUND

Many microprocessor applications rely on a robust, simple, and low-bandwidth communication path between two devices. In safety-relevant applications, a large number of communication paths are used to ensure that each safety-relevant device is functioning properly. Thus, it is important that the communication paths in such applications support fast and reliable communication without requiring an extensive number of pins or extra components.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1A:
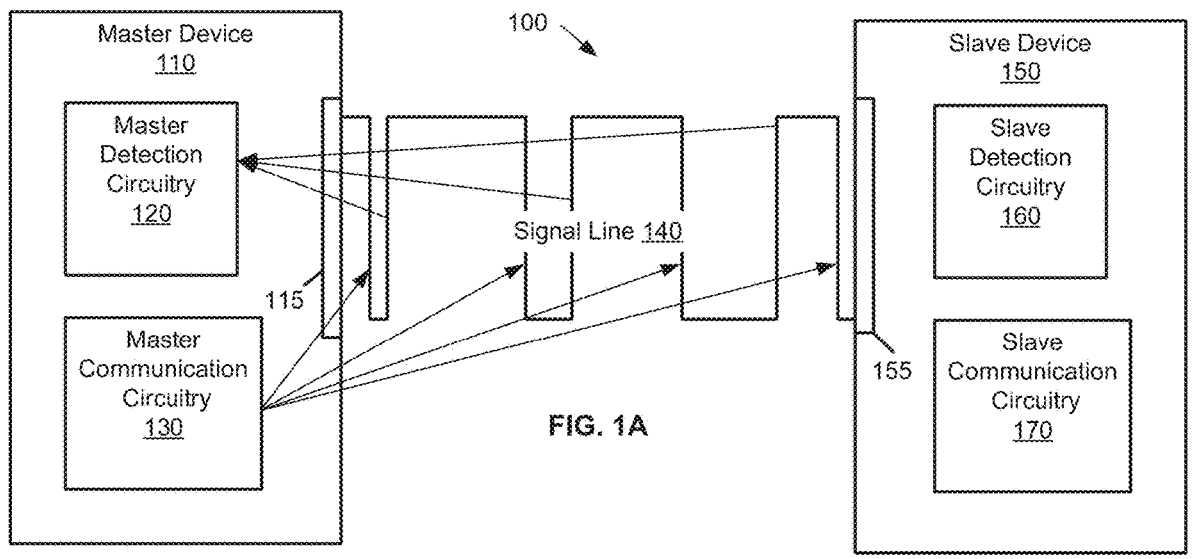
FIGS. 1A and 1B illustrate one example of a communication system that includes two devices performing bidirectional communication using edge timing in a signal in accordance with various aspects described.

In some microprocessor device applications, a central or master controller monitors the health or status of many different edge or slave devices under the control of the master controller. If any slave device malfunctions, the master controller takes remedial action such as ceasing communication with the malfunctioning device and/or entering some sort of fail safe mode with respect to the function performed by the malfunctioning device. Each slave device in turn monitors the health or status of the master controller and enters a fail safe mode in the event that the master controller malfunctions. The reaction time target for such systems is on the order of several tens of microseconds to several hundreds of microseconds. Because the malfunction of one slave device should not be allowed to corrupt the communication of another slave device, a dedicated communication channel is often installed between each slave device and the master controller. Thus the continuous monitoring of status between master controller and slave device requires fast and reliable communication through numerous communication paths.

For the purposes of this description, the terms "master" and "slave" will be used to distinguish between two devices performing the described communication using edge timing in a signal. It is to be understood that the described techniques can be performed by any two devices, regardless of whether the devices are in a master-slave relationship. Further, while certain functions in the communication techniques may be attributed to one of the master device or the slave device, it is to be understood that the functions may instead or additionally be performed by the other of the master or slave device.

In complex microprocessor applications that include communication between many devices, it is understood that leaner communication techniques provide lower failure rates and simple, less expensive design. Many conventional safety-relevant applications include a first communication channel or line that is used by the master controller to communicate a "life-sign" (e.g., a pulse at some predetermined timing) to the slave device. A second communication channel or line is used for the slave device to communicate the slave status or diagnostic information. This two-channel communication is typically synchronized according to some common clock, further complicating the communication system design. In other solutions, the slave device does not regularly send information to the master but rather blocks a communication line for a predetermined period and then sends information to the master on the line as needed. This technique slows the communication and potentially destroys the transmission from the master to the slave occurring when the line is blocked.

Described herein are methods, systems, and circuitries that perform communication using edge timing in a signal. The described methods, systems, and circuitries can use a single line to communicate both the master and slave status as well as additional information without the need for an external clock signal, thereby reducing the number of communication lines used and greatly simplifying the communication system design.

Figure 1B:
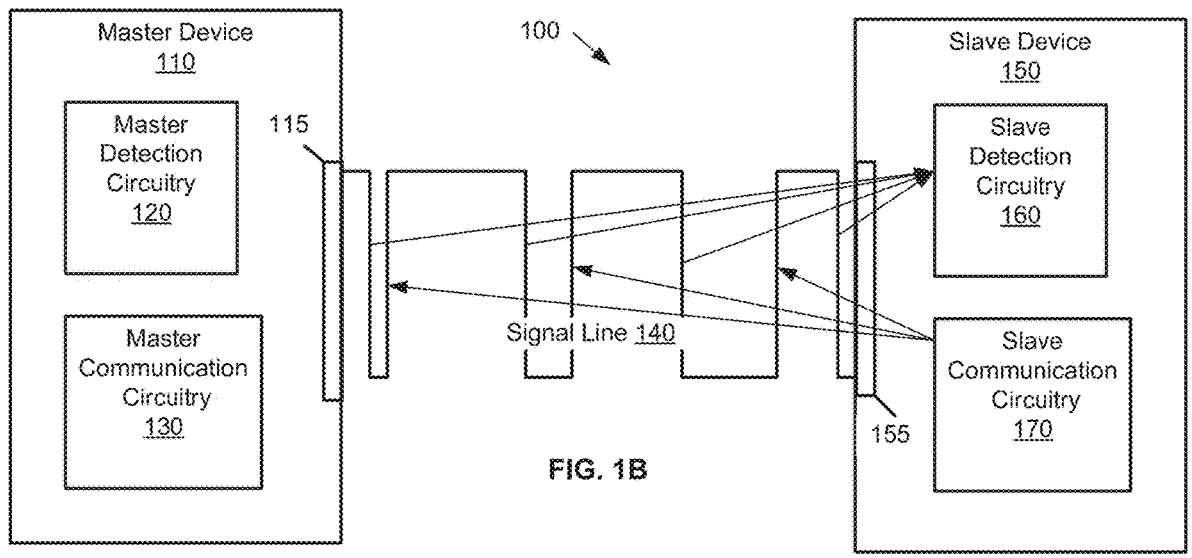

FIGS. 1A and 1B illustrate communication system 100 that includes a master device 110 (hereinafter "master") and a slave device 150 (hereinafter "slave"). In some examples the master 110 is microcontroller that provides pulse-width-modulated (PWM) or other control signals to the slave 150 and many other slaves (not shown). In some examples, the slave 150 is a gate driver for a high power device such as a fuel injector, motor, or solenoid. In some examples, the slave 150 is an isolated gate driver for a measurement device that measures, as controlled by the master 110, a temperature or voltage of another device and generates digital data encoding the measured temperature or voltage.

The master 110 and slave 150 are connected, through respective interfaces 115, 155, to a single signal line 140, which is illustrated conducting an example common signal. As will be described in more detail in FIG. 3, the common signal includes a series of alternating types edges (e.g., rising or falling). The common signal has a signal period that is defined by the time between adjacent falling edges. Of course, rising edges may define the common signal period in other examples. Throughout this description, falling edges are generated by the master and interpreted by the slave while rising edges are generated by the slave and interpreted by the master. It is to be understood that rising edges may be generated by the master and interpreted by the slave while falling edges are generated by the slave and interpreted by the master in other examples.

FIG. 1A illustrates one example of the master 110 in operation. The master 110 includes master detection circuitry 120 and master communication circuitry 130. The master detection circuitry detects 120 the timing of rising edge in each signal period and interprets the timing of the rising edge as communicating information from the slave 150. For example, the master detection circuitry 120 may interpret the timing of the rising edge as an indication of the operational status of the slave 150. The master 110 includes other components, not shown here, that are configured to take remedial action in response to the common signal indicating that the slave 150 is not functioning properly. In other examples, the master detection circuitry 120 may interpret the timing of the rising edge as communicating data generated by a component of the slave 150. The master 110 may include components, not shown, that perform additional processing on the decoded data determined by the master detection circuitry 120 based on the timing of the rising edges The master communication circuitry 130 determines, at some regular interval, a status of the master 100 and generates a falling edge in a subsequent period based on the determined status. For example, if the master 110 is functioning properly, the master communication circuitry 130 may generate a falling edge according to a predetermined timing, thus setting the signal period of the common signal to a regular time interval.

FIG. 1B illustrates one example of the slave 150 in simultaneous operation with the master 110. The slave 150 includes slave detection circuitry 160 and slave communication circuitry 170. The slave detection circuitry 160 detects the timing of the falling edges and interprets the time between adjacent falling edges as defining the signal period of the common signal. In one example the slave detection circuitry 160 determines that the master 110 is operating properly when a falling edge falls within some predetermined window within the signal period established by prior falling edges.

In each signal period, the slave communication circuitry 180 generates a rising edge in the common signal. The slave communication circuitry 180 determines information to be communicated to the master 110 and selects a timing, within the signal period, that communicates that information. For example, if the slave is functioning properly, the slave generates the rising edge at a first time in the signal period that will be interpreted by the master detection circuitry 120 as such. If the slave determines that it is not functioning properly, the slave can generate the rising edge at a second time in the signal period that will be interpreted by the master detection circuitry 120 as such. In another example, the slave 150 may have digital data (e.g., temperature or voltage) to communicate to the master 110. The slave communication circuitry 180 may select a first timing of the second edge to communicate a "1" or a second timing of the second edge to communicate a "0".

It can be seen that the communication system 100 provides a single communication line 140 that conducts a common signal that simultaneously communicates, using edge timing, information from the master 110 to the slave 150 and from the slave to the master. Throughout this description, the specific timing of edges are described as being detected. The detection of the timing of edges may be performed in many ways. For example, the value of the common signal may be checked at a certain time and the timing of an edge that occurred prior to the check time may be deduced based on the value of the signal. Alternatively, an amount of energy received during a signal period may be used to deduce a time point during the signal period where a transition from low to high occurred. For example, if the amount of energy is equal to about a third of the amount of energy that would result from a signal period where the common signal is has a high value throughout it can be deduced that the rising edge occurred at an expiration of approximately a third of the signal period.

Figure 2:
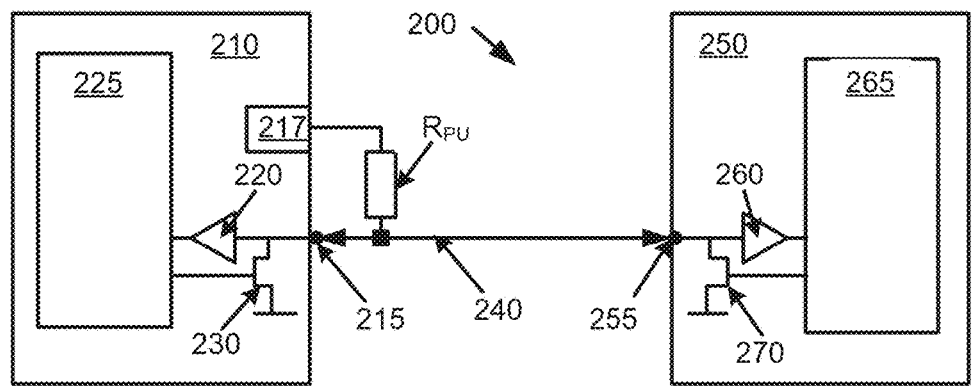
FIG. 2 illustrates one example of the communication system of FIGS. 1A and 1B in accordance with various aspects described.

FIG. 2 illustrates a communication system 200 that includes a master 210, a slave 250, and a signal line 240. The signal line 240 is configured as a "wired-AND" in which the signal line 240 is held to a high voltage using a voltage from a supply 217 in the master 210 applied to a pullup resistor $R_{PU}$ and connected to the signal line. For faster signaling, the external pullup resistor may $R_{PU}$ may be used. In other examples, an internal pullup may be sufficient. A master interface 215 and a slave interface 255 are each a single pin on the master 210 and slave 250. In one example, a standard I/O pin is used as the interfaces 215, 255.

In the example of FIG. 2, master detection circuitry includes a buffer 220 that regenerates and stores the value of the common signal on the signal line 240 at a selected time and a processor 225. The buffer 220 provides the value of the common signal to a processor 225 that is configured to interpret the value of the common signal and the selected time to determine the information being communicated from the slave 250. Slave detection circuitry includes a buffer 260 that regenerates and stores the value of the common signal on the signal line 240 at a selected time and a processor 265. The buffer 270 provides the value of the common signal to the processor 265 so that the processor can interpret the value of the common signal and the selected time to determine the status of the master 210. The processor 265 interprets a time between adjacent falling edges as defining the signal period (common signal period in FIG. 3) and thus also the time period during which the slave 150 should communicate its information (the "slave communication time period" in FIG. 3).

Master communication circuitry includes an open-drain output 230 and the processor 225. When the open-drain output is closed by the processor 225, the common signal is pulled low or set to some defined level, creating a falling edge in the common signal. The processor 225 is configured to, when the master 210 is operational, close the open-drain output 230 for a relatively short predetermined duration of time. One example of a predetermined default master communication circuitry output can be seen in the top trace in FIG. 3. The signal period of the common signal, shown in the bottom trace, is defined as the time between the falling edges generated by the open-drain output 230.

Slave communication circuitry includes an open-drain output 270 and the processor 265. When a falling edge is detected the open-drain output 270 is closed by the processor 265 for an amount of time selected to place the rising edge generated when the open-drain gate is opened at some selected timing in the signal period. The output of the slave communication circuitry (shown in the second trace in FIG. 3) combines with the default signal of the master communication circuitry to extend the low value output by the master to generate a rising edge in the common signal (third trace) at a selected time. The selected time may be a proportion of the signal period (as defined by the falling edges and not an external clock) that communicates the appropriate information (e.g., a 1 or 0) or a status (e.g., several levels of slave functionality). For the purposes of this description, the term "proportion" means a portion of the signal period that is determined based on some particular ratio or percentage of the overall signal period (e.g., 20%, 50%, 100%, and so on) as defined by the duration of time between consecutive falling edges.

Figure 3:
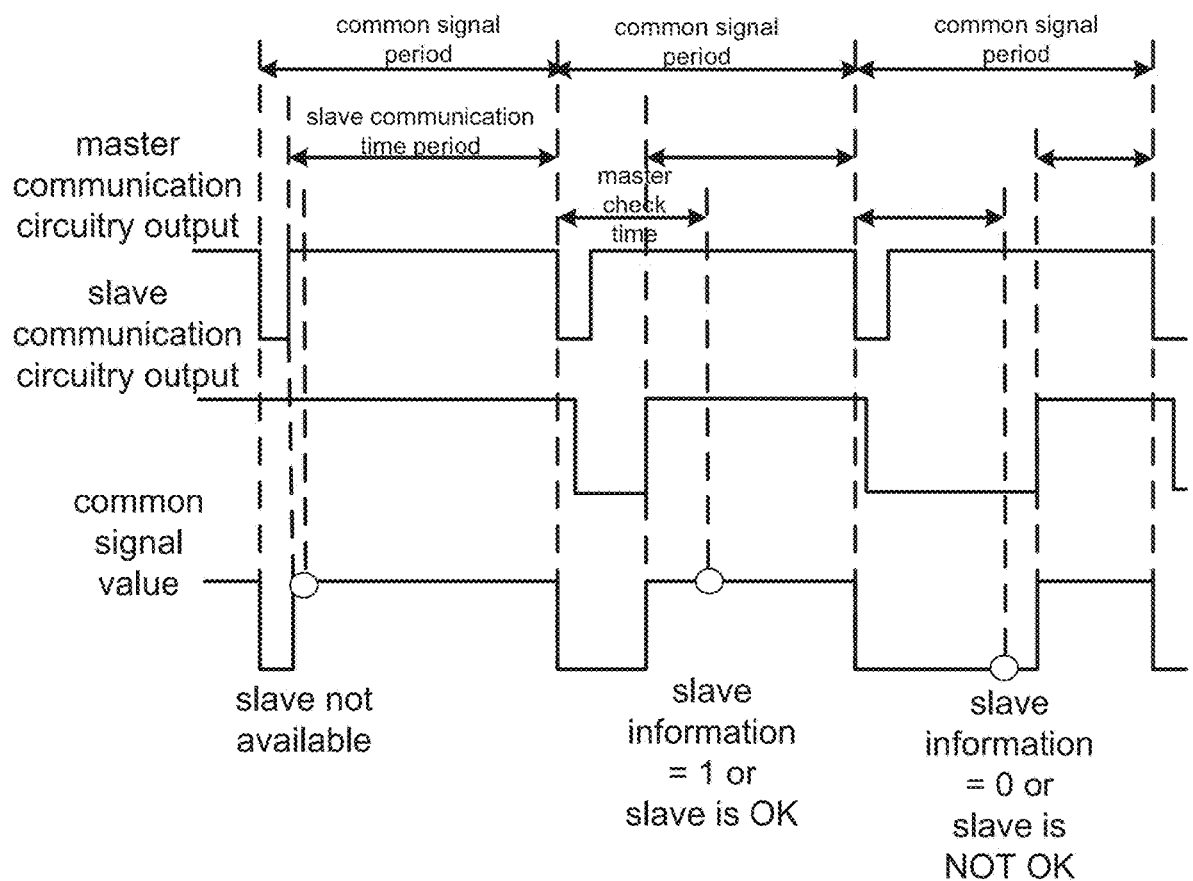
FIG. 3 illustrates a timing diagram of one communication protocol for bidirectional communication using edge timing in a signal in accordance with various aspects described.

FIG. 3 illustrates an example of how three different second edge positions in three different signal periods can communicate three different slave operational statuses and/or data values. As shown in the first signal period, when the slave does not act on the common signal at all the rising edge in the common signal occurs at the termination of the pulse sent by the master communication circuitry. If the master detection circuitry detects the rising edge (or a high value) at a time corresponding to the end of the master's pulse, the master interprets this rising edge as indicating that the slave is not available and takes remedial action if necessary or waits to determine if the slave becomes available later.

In each signal period, if the slave has acted on the common signal (e.g., is available) the master detection circuitry checks the value of the common signal at a predetermined time after the end of the master's pulse (e.g., midway or 50% through the signal period as shown by the "master check time" and circle on the common signal in FIG. 3). In the second signal period, when the master detection circuitry checks the common signal at the master check time, a high value is detected. This high value at the master check time is interpreted by the master detection circuitry as indicating that the slave is operational or, alternatively, that the slave is sending a data value of 1. Correspondingly the slave communication circuitry communicates that it is operational or sends a data value of 1 by holding the common signal line low for less than the master check time (e.g., less than 50% of the signal period).

In the third signal period when the master detection circuitry checks the common signal at the master check time, a low value is detected. This low value at the master check time is interpreted by the master detection circuitry as communicating that the slave is not operational or, alternatively, that the slave is sending a data value of 0. Correspondingly the slave communication circuitry communicates that it is operational or sends a data value of 0 by holding the common signal line low for more than the master check time (e.g., more than 50% of the signal period).

Note that the time at which the master detection circuitry checks the common signal (and the time at which the slave communication circuitry generates falling edges) may be defined as a function or proportion of the signal period, which is in turn defined by the falling edges generated by the master communication circuitry and not an external clock. No external clock signal is necessary. There are no constraints on baud rate. If the timing of the falling edges changes during operation the signal period used by both master and slave will change and the communication will still be effective.

The scheme illustrated in FIG. 3 can be extended to allow the slave to communicate several different status modes. For example, a rising edge within a first time period (e.g., a first 20% of the signal period) may indicate that the slave is functional. A rising edge in a subsequent time period (e.g., a next 20% of the signal period) may indicate that the slave is experiencing an under-voltage condition. A rising edge in a subsequent time period (e.g., a next 20% of the signal period) may indicate that the slave is experiencing an over-voltage condition. A rising edge in a subsequent time period (e.g., a next 20% of the signal period) may indicate that the slave is experiencing an over-temperature condition. A rising edge in a subsequent time period (e.g., a next 20% of the signal period) may indicate that the slave is experiencing a short circuit condition. The master detects which one of these conditions is being experienced by the slave by determining during which time period a high value in the common signal is first detected.

Figure 4:
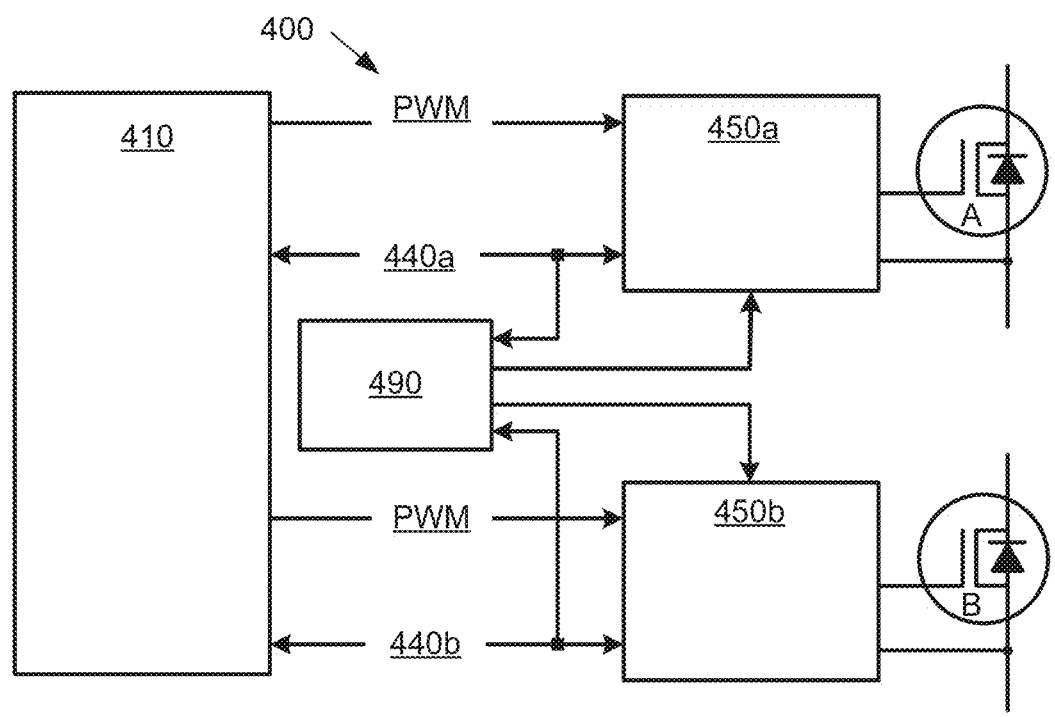
FIG. 4 illustrates one example of the communication system of FIGS. 1A and 1B in accordance with various aspects described.

FIG. 4 illustrates a communication system 400 that includes a microcontroller 410 acting as a master to two safety-related gate drivers 450a, 450b. The microcontroller 410 provides independent PWM control signals to the gate drivers 450a, 450b and also communicates and receives operational status information on signal lines 440a, 440b, respectively. In one example, the microcontroller 410 sets falling edges in the common signal on lines 440a, 440b to provide both status and timing to the gate drivers 450a, 450b while the gate drivers 450a, 450b set rising edges to communicate one of several levels of operational status (including unavailability) as described with reference to FIG. 3.

A safety circuitry 490 monitors the common signals on signal lines 440a, 440b. The safety circuitry determines the signal period of each common signal as well as the status of the microcontroller 410 based on the timing of falling edges and also determines the status of the corresponding gate driver based on the timing of rising edges. When the safety circuitry 490 determines that the common signal indicates that the microcontroller 410 or gate driver 450a or 450b is malfunctioning, the safety circuitry 490 provides fail-safe (e.g., limp-home or safety mode) instructions to the affected gate driver. In this manner, an additional fail safe is provided by the safety circuitry acting independently in response to the common signal. Note that the safety circuitry 490 may use only a single pin to monitor the each common signal instead of utilizing a dedicated signal line for the microcontroller life sign signal and each gate driver's status signal. Further no complicated decoding mechanism is necessary.

Figure 5:
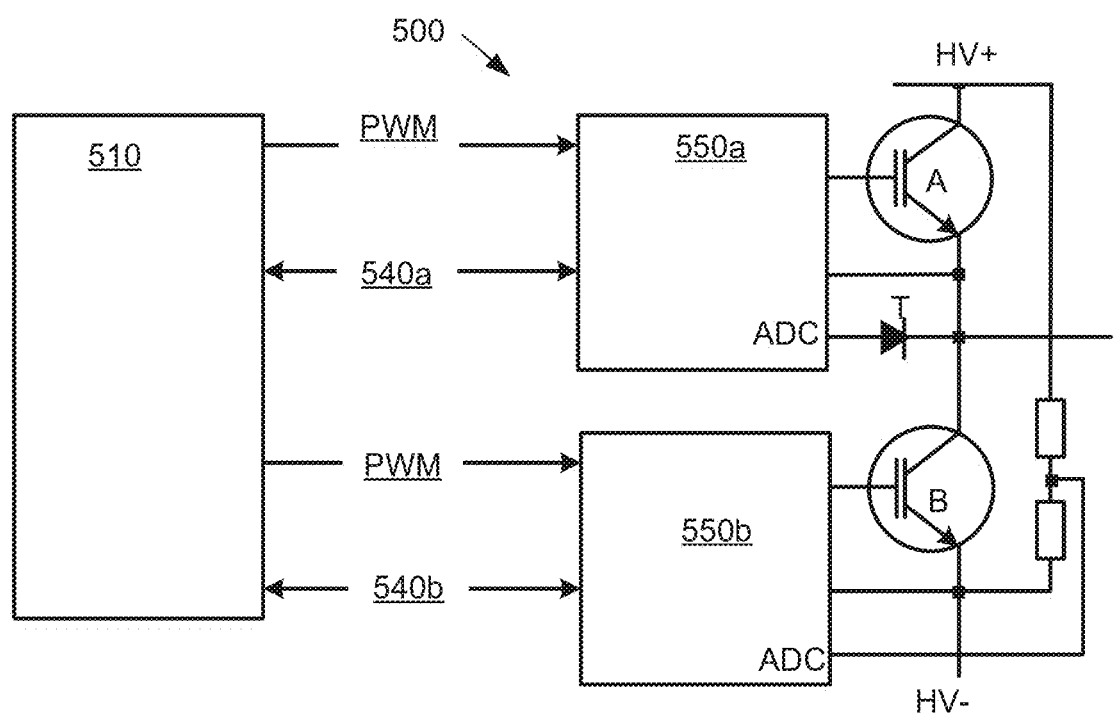
FIG. 5 illustrates one example of the communication system of FIGS. 1A and 1B in accordance with various aspects described.

FIG. 5 illustrates a communication system 500 that includes a microcontroller 510 acting as a master to two isolated gate drivers 550a, 550b used in high voltage applications. Each gate driver includes an analog-to-digital converter (ADC), such as a sigma-delta converter, that converts an analog measurement signal provided by the associated measurement device A or B to a digital signal. In the illustrated example the device A measures a temperature of a power switch and the device B measures a voltage on an isolated secondary side (e.g., a DC Link) as shown in FIG. 5. The microcontroller 510 provides independent PWM control signals to the gate drivers 550a, 550b and also communicates its status information on signal lines 540a, 540b, respectively. In one example, the microcontroller 510 sets falling edges to provide both status and timing for the common signal to the gate drivers 550a, 550b. The microcontroller 510 can determine slave availability by an "early" check for a high value as described with reference to FIG. 3. The gate drivers 550a, 550b set rising edges in the common signal to communicate data from the ADC. In many applications the voltage or temperature being measured changes very slowly while the measurement signal is very noisy. This makes the use of a sigma delta ADC in the gate drivers 550a, 550 especially advantageous.

In one example, the timing signal provided by the falling edges in the common signal can be used as the clock signal to the sigma delta ADC and in each signal period, the ADC can communicate either a 1 or 0 by controlling the position of the rising edge as shown in FIG. 3. Because the microcontroller is also aware of the timing signal, decoding of the incoming sigma delta ADC data and time stamping is simplified.

Figure 6:
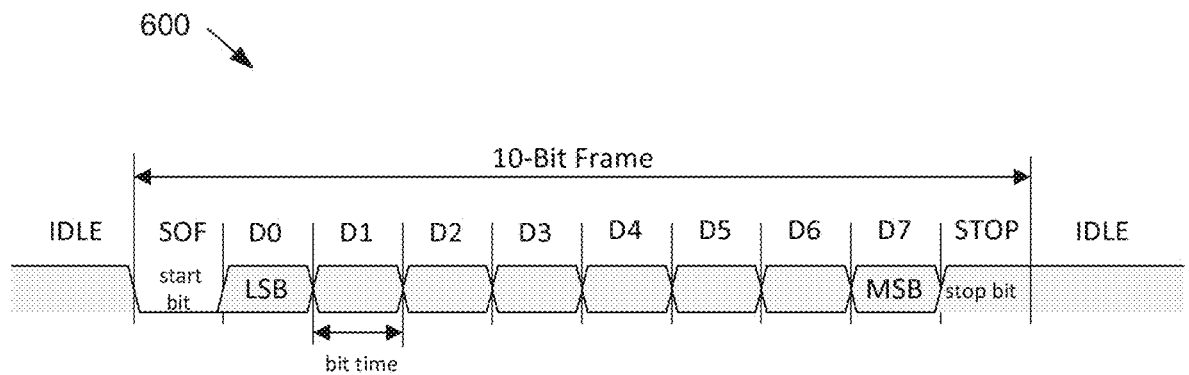
FIG. 6 illustrates one example of an eight-bit Universal Asynchronous Receiver Transmitter (UART) signal format.

In another example, the timing of rising edges generated by the gate drivers 550a, 550b can be used to simulate a UART signal that communicates more sophisticated diagnostic and measurement data. FIG. 6 illustrates an example eight-bit UART signal 600. The UART signal includes a ten bit data frame that begins with a start bit and ends with a stop bit. Thus, in each frame eight bits of information (e.g., starting with the least significant bit and ending with the most significant bit) can be serially communicated. The IDLE level of either the transmitter or receiver is the high level. In UART communication, both devices must use the same duration for the ten bit frame, which typically requires a synchronized clock signal for both devices.

Returning to FIG. 5, the gate drivers 550a, 550b may set rising edges in the common signal to communicate data from the ADC in a UART format. Each gate driver determines the duration of the signal period/UART data frame based on the falling edges in the common signal. During each of the signal periods the gate driver may transmit at least one bit of the UART signal. The complete UART frame may be transmitted in several consecutive signal periods. In this manner the microcontroller defines the bit timing for the gate driver and no complex timing adjustments are necessary.

Figure 7:
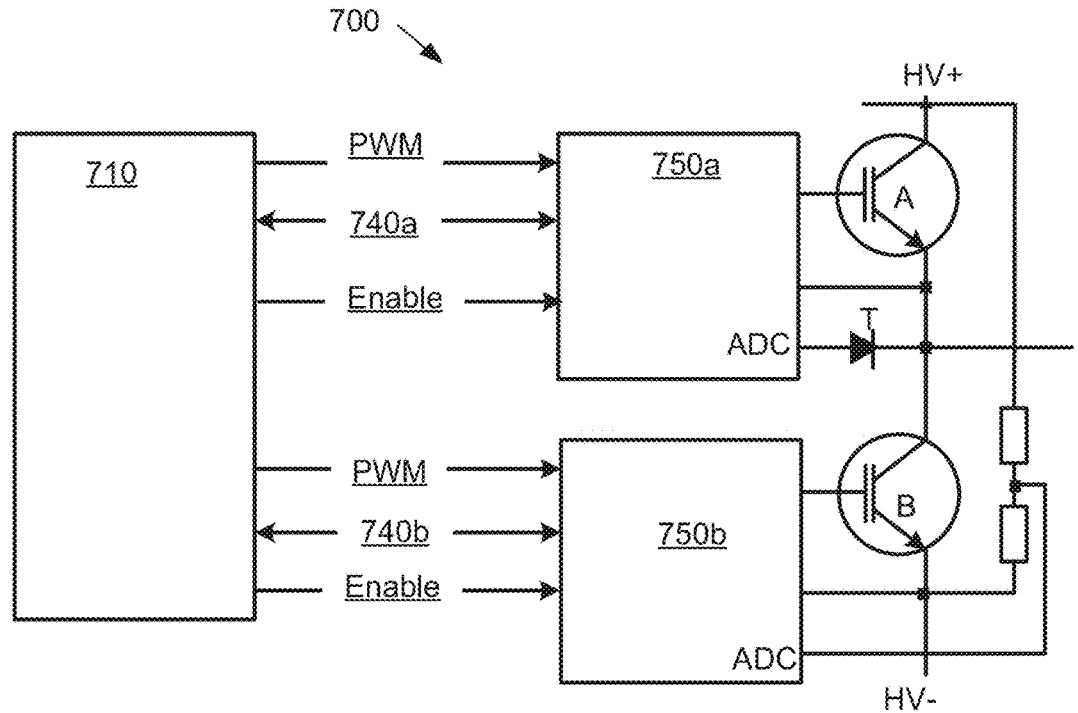
FIG. 7 illustrates one example of the communication system of FIGS. 1A and 1B in accordance with various aspects described.

FIG. 7 illustrates a communication system 700 that includes a microcontroller 710 acting as a master to two isolated gate drivers 750a, 750b used in high voltage applications. Each gate driver includes an analog-to-digital converter (ADC), such as a sigma-delta converter, that converts an analog measurement signal provided by the associated measurement device A or B to a digital signal. In the illustrated example the device A measures a temperature of a power switch and the device B measures a voltage on an isolated secondary side (e.g., a DC Link) as shown in FIG. 7. During normal operation, the microcontroller 710 provides independent PWM control signals to the gate drivers 750a, 750b and also communicates its status information on signal lines 740a, 740b, respectively. In one example, the microcontroller 710 sets falling edges in the common signal to provide both status and timing to the gate drivers 750a, 750b. The gate drivers 750a, 750b can communicate their availability and functionality as described with reference to FIG. 3.

The communication system 700 also includes an enable line that the microcontroller 710 uses to set the gate drivers 750a, 750b to a configuration mode. When a gate driver 750a is in configuration mode, the microcontroller uses common signal line 740a to transfer some bytes of information in the UART format described with reference to FIGS. 5 and 6. In configuration mode, the gate driver 750a may use the common signal line 740 to communicate diagnostic or feedback data in UART or PWM format. In this manner, the use of the enable setting may select between an operating mode and a configuration mode. In the configuration mode, the gate driver output may switch off (deactivate) the power switch independently from the state of the PWM line. The PWM line and the common signal line may then be used as clock and data signal for data transfer between the master device and the slave device, e.g., to transfer timing information on one line and communication data on the other line. In this manner, the communication bandwidth can be increased and the configuration of the slave device can be accomplished more quickly.

Figure 8A:
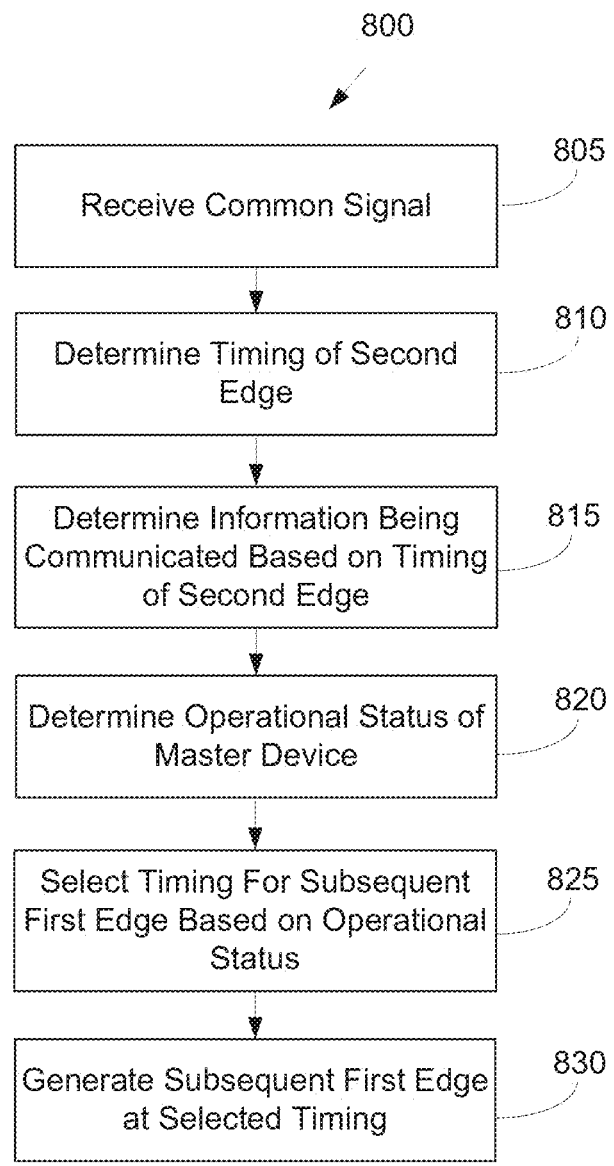
FIGS. 8A and 8B illustrates example methods for performing bidirectional communication using edge timing in a signal in accordance with various aspects described.

FIG. 8A illustrates an example method 800 performed by a device for communicating with another device using edge timing in a common signal. The method 800 may be performed, for example, by master 110, 210 or microcontroller 410, 510, 710 of FIGS. 1, 2, 4, 5, and 7, respectively. At 805 the method includes receiving a common signal on a signal line between the master device and the slave device. The common signal includes a series of signal periods that each include a first edge of a first type and a second edge of a second type different from the first type. In each signal period of the series of signal periods, a timing of the second edge with respect to the signal period is determined at 810, information being communicated by the slave device is determined based at least on the determined timing of the second edge at 815; an operational status of the master device is determined at 820; a timing for a subsequent first edge with respect to the signal period is selected based at least on the determined operational status at 825; and the subsequent first edge is generated at the selected timing in a subsequent signal period of the series of signal periods at 830.

Figure 8B:
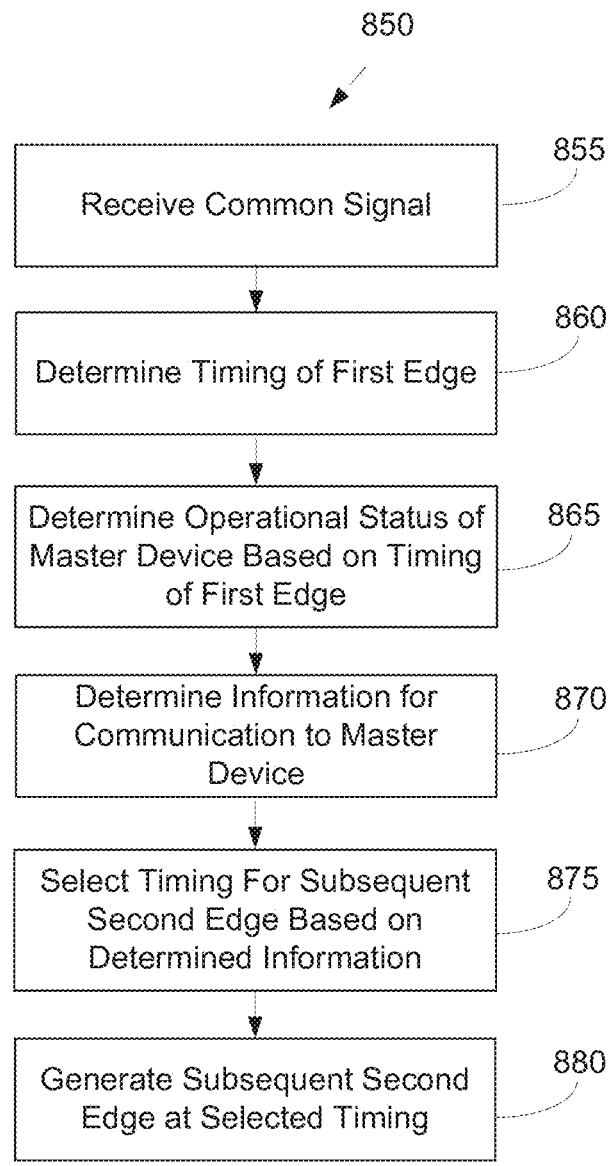

FIG. 8B illustrates an example method 850 performed by a device for communicating with another device using edge timing in a common signal. The method 850 may be performed, for example, by slave 150, 250 or drivers 450a, 450b, 550a, 550b, 750a, 750b of FIGS. 1, 2, 4, 5, and 7, respectively. At 855, the method includes receiving a common signal on a signal line between the slave device and the master device. The common signal includes a series of signal periods that each include a first edge of a first type and a second edge of a second type different from the first type. In each signal period of the series of signal periods, a timing of the first edge with respect to the signal period is determined at 860; an operational status of the master device is determined based at least on the determined timing of the first edge at 865; information for communication to the other device is determined at 870; a timing for a subsequent second edge with respect to the signal period is selected based at least on the determined information at 875; and the subsequent second edge is generated at the selected timing in a subsequent signal period of the series of signal periods at 880.

It can be seen from the foregoing description that the described systems, circuitries, and methods allow for the communication of status and/or data between two devices with a common signal conducted on a single signal line by using the timing of one type of edge in the common signal to convey information about a first device and the timing of the other type of edge to convey information about a second device.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for bidirectional communication using edge timing according to embodiments and examples described herein.

Example 1 is a method, including, with a master device, receiving a common signal on a signal line between the master device and a slave device, wherein the common signal includes a series of signal periods, and wherein each signal period includes a first edge of a first type and a second edge of a second type different from the first type. The method includes, in each signal period of the series of signal periods: determining a timing of the second edge with respect to the signal period; determining information being communicated by the slave device based at least on the determined timing of the second edge; determining an operational status of the master device; selecting a timing for a subsequent first edge with respect to the signal period based at least on the determined operational status; and generating the subsequent first edge at the selected timing in a subsequent signal period of the series of signal periods.

Example 2 includes the subject matter of example 1, including or omitting optional elements, further including: determining a value of the common signal during a window including a predetermined proportion of the signal period; and determining an operational status of the slave device based on the value.

Example 3 includes the subject matter of example 1, including or omitting optional elements, further including, in response to determining that the operational status of the master device is satisfactory, selecting a predetermined default timing for the subsequent first edge.

Example 4 includes the subject matter of example 1, including or omitting optional elements, further including decoding data output by a component in the slave device based at least on the determined timing of the second edge and performing subsequent processing on the decoded data.

Example 5 includes the subject matter of example 1, including or omitting optional elements, further including determining an operational status of the slave device based at least on the determined timing of the second edge.

Example 6 includes the subject matter of example 1, including or omitting optional elements, further including determining one of plurality of failure modes for the slave device based at least on the determined timing of the second edge.

Example 7 includes the subject matter of example 1, including or omitting optional elements, wherein the master device and the slave device are connected to each other using a wired-AND connection, and wherein generating the subsequent first edge includes selectively setting the signal line to a defined level at the selected timing in the subsequent signal period of the series of signal periods.

Example 8 includes the subject matter of example 1, including or omitting optional elements, wherein the signal line between the master device and the slave device includes a single signal line.

Example 9 is a method, including, with a slave device, receiving a common signal on a signal line between the slave device and a master device, wherein the common signal includes a series of signal periods, and wherein each signal period includes a first edge of a first type and a second edge of a second type different from the first type. The method includes, in each signal period of the series of signal periods: determining a timing of the first edge with respect to the signal period; determining an operational status of the master device based at least on the determined timing of the first edge; determining information for communication to the master device; selecting a timing for a subsequent second edge with respect to the signal period based at least on the determined information; and generating the subsequent second edge at the selected timing in a subsequent signal period of the series of signal periods.

Example 10 includes the subject matter of example 9, including or omitting optional elements, further including: determining a duration of the signal period; and determining an operational status of the master device based on the determined duration.

Example 11 includes the subject matter of example 9, including or omitting optional elements, further including determining a duration of the signal period based at least on a time between one or more pairs of consecutive first edges.

Example 12 includes the subject matter of example 11, including or omitting optional elements, further including: determining a proportion of the signal period that communicates the determined information; and wherein the timing for the subsequent second edge is selected to correspond with an expiration of the determined proportion of the subsequent signal period.

Example 13 includes the subject matter of example 1, including or omitting optional elements, further including: determining data output by a component in the slave device as the information; and wherein the timing for the subsequent second edge is selected based at least on the data and the determined duration of the signal period.

Example 14 includes the subject matter of example 9, including or omitting optional elements, wherein the master device and the slave device are connected to each other using a wired-AND connection, and wherein generating the subsequent second edge includes selectively setting the signal line to a defined level at the selected timing in the subsequent signal period of the series of signal periods.

Example 15 includes the subject matter of example 9, including or omitting optional elements, wherein the signal line between the master device and the slave device includes a single signal line.

Example 16 is a master device configured to be connected to a slave device by a signal line, wherein the signal line conducts a common signal including a series of signal periods, and wherein each signal period includes a first edge of a first type and a second edge of a second type different from the first type. The master device includes master detection circuitry and master communication circuitry. The master detection circuitry is configured to: determine a timing of the second edge with respect to the signal period; and determine information being communicated by the slave device based at least on the determined timing of the second edge. The master communication circuitry is configured to: determine an operational status of the master device; select a timing for a subsequent first edge with respect to the signal period based at least on the determined operational status of the master device; and generate the subsequent first edge at the selected timing in a subsequent signal period of the series of signal periods.

Example 17 includes the subject matter of example 16, including or omitting optional elements, wherein the master device and the slave device are connected to each other using a wired-AND connection, and wherein the master communication circuitry includes a switch controllable to selectively set the signal line to a defined level at the selected timing in the subsequent signal period of the series of signal periods.

Example 18 includes the subject matter of example 16, including or omitting optional elements, wherein the master detection circuitry is configured to: determine a value of the common signal during a window including a predetermined proportion of the signal period; and determine an operational status of the slave device based on the value.

Example 19 includes the subject matter of example 16, including or omitting optional elements, wherein the master communication circuitry is further configured to select a predetermined default timing for the subsequent first edge in response to determining that the operational status of the master device is satisfactory.

Example 20 includes the subject matter of example 16, including or omitting optional elements, wherein the master detection circuitry is further configured to decode data output by a component in the slave device based on the determined timing of the second edge and to perform subsequent processing on the decoded data.

Example 21 includes the subject matter of example 16, including or omitting optional elements, wherein the master detection circuitry is further configured to determine one of a plurality of failure modes for the slave device based at least on the determined timing of the second edge.

Example 22 includes the subject matter of example 16, including or omitting optional elements, wherein the signal line between the master device and the slave device includes a single signal line.

Example 23 is a slave device configured to be connected to a master device by a signal line, wherein the signal line conducts a common signal including a series of signal periods, and wherein each signal period includes a first edge of a first type and a second edge of a second type different from the first type. The slave device includes slave detection circuitry and slave communication circuitry. The slave detection circuitry is configured to: determine a timing of the first edge with respect to the signal period; and determine an operational status of the master device based at least on the determined timing of the first edge. The slave communication circuitry is configured to: determine information for communication to the master device; select a timing for a subsequent second edge with respect to the signal period based at least on the determined information; and generate the subsequent second edge at the selected timing in a subsequent signal period of the series of signal periods.

Example 24 includes the subject matter of example 23, including or omitting optional elements, wherein the slave detection circuitry is further configured to: determine a duration of the signal period; and determine an operational status of the master device based on the determined duration.

Example 25 includes the subject matter of example 23, including or omitting optional elements, wherein the slave detection circuitry is further configured to determine a duration of the signal period based at least on a time between one or more pairs of consecutive first edges.

Example 26 includes the subject matter of example 25, including or omitting optional elements, wherein the slave communication circuitry is further configured to: determine a proportion of the signal period that communicates the determined information; and select the timing of the subsequent second edge to correspond to an expiration of the determined proportion of the subsequent signal period.

Example 27 includes the subject matter of example 23, including or omitting optional elements, wherein the slave communication circuitry is further configured to: determine data output by a component in the slave device as the information; and select the timing for the subsequent second edge based at least on the data.

Example 28 includes the subject matter of example 23, including or omitting optional elements, wherein the signal line between the master device and the slave device includes a single signal line.

Example 29 includes the subject matter of example 23, including or omitting optional elements, wherein the master device and the slave device are connected to each other using a wired-AND connection, and wherein the slave communication circuitry includes a switch controllable to selectively set the signal line to a defined level at the selected timing in the subsequent signal period of the series of signal periods.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

Various illustrative logics, logical blocks, modules, circuitries, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

What is claimed is:

1. A method, comprising, with a master device:
   determining an operational status of the master device;
   generating a master signal, wherein the master signal comprises a series of signal periods, and wherein each signal period of the master signal comprises a first edge of a first type, wherein a timing of the first edge in the master signal is based the determined operational status;
   transmitting the master signal on a signal line between the master device and a slave device;
   receiving a common signal on the signal line, wherein each signal period of the common signal includes no more than one first edge of the first type generated by the master device and no more than one second edge of a second type generated by the slave device, wherein the second type is different from the first type; and
   in each signal period of the common signal:
      generating the first edge in the common signal by transmitting the master signal on the signal line;
      determining a timing of an immediately subsequent second edge with respect to the first edge; and
      determining information being communicated by the slave device based at least on the determined timing of the second edge.

2. The method of claim 1, further comprising:
   determining a value of the common signal during a window comprising a predetermined proportion of the signal period; and
   determining an operational status of the slave device based on the value.

3. The method of claim 1, further comprising, in response to determining that the operational status of the master device is satisfactory, selecting a predetermined default timing for a subsequent first edge.

4. The method of claim 1, further comprising decoding data output by a component in the slave device based at least on the determined timing of the second edge and performing subsequent processing on the decoded data.

5. The method of claim 1, further comprising determining an operational status of the slave device based at least on the determined timing of the second edge.

6. The method of claim 1, further comprising determining one of plurality of failure modes for the slave device based at least on the determined timing of the second edge.

7. The method of claim 1, wherein the master device and the slave device are connected to each other using a wired-AND connection, and wherein transmitting the master signal comprises selectively setting the signal line to a defined level at the selected timing to generate the first edge.

8. The method of claim 1, wherein the signal line between the master device and the slave device comprises a single signal line.

9. A method, comprising, with a slave device:
   receiving a common signal on a signal line between the slave device and a master device, wherein the common signal comprises a series of signal periods, and wherein each signal period of the common signal comprises no more than one first edge of a first type and no more than one second edge of a second type different from the first type; and
   in each signal period of the series of signal periods:
      determining information for communication to the master device;
      determining a timing that communicates the information;
      identifying a first edge in the common signal, the first edge generated by the master signal;
      transmitting the slave signal on the signal line, wherein the slave signal includes a second edge at the timing with respect to the first edge such that the common signal includes the first edge having a timing set by the master device and a second edge having a timing that is set by the slave device;
      determining a timing of the first edge with respect to the signal period; and
      determining an operational status of the master device based at least on the determined timing of the first edge.

10. The method of claim 9, further comprising:
    determining a duration of the signal period; and
    determining an operational status of the master device based on the determined duration.

11. The method of claim 9, further comprising determining a duration of the signal period based at least on a time between one or more pairs of consecutive first edges.

12. The method of claim 11, further comprising:
determining a proportion of the signal period that communicates the determined information; and
wherein the timing for the second edge is selected to correspond with an expiration of the determined proportion of the signal period.

13. The method of claim 11, further comprising:
determining data output by a component in the slave device as the information; and
wherein the timing for the second edge is selected based at least on the data and the determined duration of the signal period.

14. The method of claim 9, wherein the master device and the slave device are connected to each other using a wired-AND connection, and wherein transmitting the slave signal comprises selectively setting the signal line to a defined level at the selected timing to generate the second edge in the common signal.

15. The method of claim 9, wherein the signal line between the master device and the slave device comprises a single signal line.

16. A master device configured to be connected to a slave device by a signal line, the master device comprising:
master communication circuitry configured to:
determine an operational status of the master device; and
generate a master signal, wherein the master signal comprises a series of signal periods, and wherein each signal period of the master signal comprises a first edge of a first type, wherein a timing of the first edge in the master signal is based the determined operational status;
transmit the master signal on the signal line; and
master detection circuitry configured to:
receive a common signal, wherein each signal period of the common signal includes no more than one first edge of the first type generated by the master device and no more than one second edge of a second type generated by the slave device, wherein the second type is different from the first type;
for each signal period of the common signal:
generate a first edge in the common signal by transmitting the master signal on the signal line;
determine a timing of an immediately subsequent second edge with respect to the first edge; and
determine information being communicated by the slave device based at least on the determined timing of the second edge.

17. The master device of claim 16, wherein the master device and the slave device are connected to each other using a wired-AND connection, and wherein the master communication circuitry comprises a switch controllable to selectively set the signal line to a defined level at a selected timing in the signal period.

18. The master device of claim 16, wherein the master detection circuitry is configured to:
determine a value of the common signal during a window comprising a predetermined proportion of the signal period; and
determine an operational status of the slave device based on the value.

19. The master device of claim 16, wherein the master communication circuitry is further configured to select a predetermined default timing for a subsequent first edge in response to determining that the operational status of the master device is satisfactory.

20. The master device of claim 16, wherein the master detection circuitry is further configured to decode data output by a component in the slave device based on the determined timing of the second edge and to perform subsequent processing on the decoded data.

21. The master device of claim 16, wherein the master detection circuitry is further configured to determine one of a plurality of failure modes for the slave device based at least on the determined timing of the second edge.

22. The master device of claim 16, wherein the signal line between the master device and the slave device comprises a single signal line.

23. A slave device configured to be connected to a master device by a signal line, wherein the signal line conducts a common signal comprising a series of signal periods, and wherein each signal period of the common signal comprises no more than one first edge of a first type and no more than one second edge of a second type different from the first type; the slave device comprising:
slave detection circuitry configured to:
for each signal period, determine a timing of the first edge with respect to the signal period; and
determine an operational status of the master device based at least on the determined timing of the first edge; and
slave communication circuitry configured to:
determine information for communication to the master device;
determine a timing that communicates the information;
identify a first edge in the common signal, the first edge generated by the master signal;
transmit a slave signal on the signal line, wherein the slave signal includes a second edge at the timing with respect to the first edge such that the common signal includes the first edge having a timing set by the master device and a second edge having a timing that is set by the slave device.

24. The slave device of claim 23, wherein the slave detection circuitry is further configured to:
determine a duration of the signal period; and
determine an operational status of the master device based on the determined duration.

25. The slave device of claim 23, wherein the slave detection circuitry is further configured to determine a duration of the signal period based at least on a time between one or more pairs of consecutive first edges.

26. The slave device of claim 25, wherein the slave communication circuitry is further configured to:
determine a proportion of the signal period that communicates the determined information; and
select the timing of the subsequent second edge to correspond to an expiration of the determined proportion of the subsequent signal period.

27. The slave device of claim 23, wherein the slave communication circuitry is further configured to:
determine data output by a component in the slave device as the information; and
select the timing for the subsequent second edge based at least on the data.

28. The slave device of claim 23, wherein the signal line between the master device and the slave device comprises a single signal line.

29. The slave device of claim 23, wherein the master device and the slave device are connected to each other using a wired-AND connection, and wherein the slave communication circuitry comprises a switch controllable to selectively set the signal line to a defined level at the selected timing in the subsequent signal period of the series of signal periods.

* * * * *

UNITED STATES PATENT AND TRADEMARK OFFICE
CERTIFICATE OF CORRECTION

| | | |
|---|---|---|
| PATENT NO. | : 10,855,527 B2 | Page 1 of 1 |
| APPLICATION NO. | : 15/943985 | |
| DATED | : December 1, 2020 | |
| INVENTOR(S) | : Barrenscheen et al. | |

It is certified that error appears in the above-identified patent and that said Letters Patent is hereby corrected as shown below:

In the Claims

Column 13, Line 57-58 (Claim 1): the text "master signal is based the determined operational status;" should read --master signal is based on the determined operational status;--

Column 15, Line 35 (Claim 16): the text "edge in the master signal is based the determined" should read --edge in the master signal is based on the determined--

Signed and Sealed this
Twelfth Day of January, 2021

Andrei Iancu
*Director of the United States Patent and Trademark Office*